(12) United States Patent
David et al.

(10) Patent No.: US 8,327,172 B2
(45) Date of Patent: Dec. 4, 2012

(54) ADAPTIVE MEMORY FREQUENCY SCALING

(75) Inventors: Howard S. David, Portland, OR (US); Hongzhong Zheng, Sunnyvale, CA (US); Eugene Gorbatov, Hillsboro, OR (US); Ulf R. Hanebutte, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 133 days.

(21) Appl. No.: 12/821,874

(22) Filed: Jun. 23, 2010

(65) Prior Publication Data

US 2011/0320846 A1    Dec. 29, 2011

(51) Int. Cl.
*G06F 1/00* (2006.01)
(52) U.S. Cl. .................... 713/322; 718/105
(58) Field of Classification Search ............ 713/322, 713/340, 300–320, 324; 718/105
See application file for complete search history.

(56) References Cited

U.S. PATENT DOCUMENTS

| 5,860,106 | A | 1/1999 | Domen et al. |
| 6,112,310 | A | 8/2000 | Jun et al. |
| 6,263,448 | B1 | 7/2001 | Tsern et al. |
| 7,814,485 | B2 * | 10/2010 | Morgan et al. ......... 718/100 |
| 8,078,890 | B2 * | 12/2011 | Nijhawan et al. ...... 713/320 |
| 2011/0022871 | A1 * | 1/2011 | Bouvier et al. ........ 713/340 |

OTHER PUBLICATIONS

Combined Search and Examination Report for United Kingdom Patent Application No. GB1109042.0 mailed Sep. 28, 2011, 15 pgs.

* cited by examiner

*Primary Examiner* — Clifford Knoll
(74) *Attorney, Agent, or Firm* — Blakely, Sokoloff, Taylor & Zafman LLP

(57) ABSTRACT

Methods and apparatuses for adaptive memory operational state management. A memory performance parameter is determined for at least a portion of a memory system. The memory performance parameter is compared to one or more threshold values. An operating frequency of the memory system can be modified based on results of the comparison of the memory performance parameter and the one or more threshold values.

15 Claims, 4 Drawing Sheets

ADAPTIVE MEMORY FREQUENCY SCALING

RELATED APPLICATIONS

This U.S. Patent Application is related to co-pending U.S. patent application Ser. No. 12/821,867, entitled "MEMORY POWER MANAGEMENT VIA DYNAMIC MEMORY OPERATION STATES," which was filed concurrently herewith.

TECHNICAL FIELD

Embodiments of the invention relate to memory devices. More particularly, embodiments of the invention relate to techniques for adaptively scaling the operating frequency of a memory device.

BACKGROUND

Enterprise server systems as well as other electronic systems have seen an increased focus on energy efficiency and energy proportional computing in the last several years. Managing memory power is critical to the overall efficiency in these platforms given capacity and bandwidth requirements of server processors and workloads.

As the number of processing cores continues to increase and integration of throughput computing and input/output (I/O) capabilities accelerates this trend is expected to intensify making memory power management a key element of platform energy efficiency. One approach is to focus on reducing idle memory power through aggressive support of power-down and self-refresh states leading to significant improvements in memory power efficiency.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Memory power has become a first order consideration of computer system design. However, memory power management without global information might not be enough to optimize power consumption for the runtime application. Coordinating memory power management with processing core and/or platform information may be utilized to provide improved power utilization. Described herein are Adaptive Memory Frequency Scaling Mechanisms (AMFSMs) that may use memory performance indicators available to a processing core to optimize memory subsystem power at run time.

The adaptive memory frequency scaling mechanisms may provide at least two advantages. For throughput-sensitive workloads, adaptive memory frequency scaling mechanisms can achieve high efficiency. For latency-insensitive applications, adaptive memory frequency scaling mechanisms can slow down memory frequency to provide power savings with only a relatively small performance loss for processing core intensive workloads and keep the memory frequency to maintain the performance for memory intensive workloads.

In one embodiment, when 100% utilization is applied (performance is the highest priority), adaptive memory frequency scaling mechanisms can cause the memory to operate at maximum frequency to achieve best performance. When utilization is less than 100%, adaptive memory frequency scaling mechanisms can slow down memory operating frequency to bring performance gains for a given power budget because the power saving on memory side shifts to the processing core. Alternatively, when utilization is under 100%, adaptive memory frequency scaling mechanisms can reduce memory operating frequency to achieve overall system power saving for given performance target.

Figure 1:
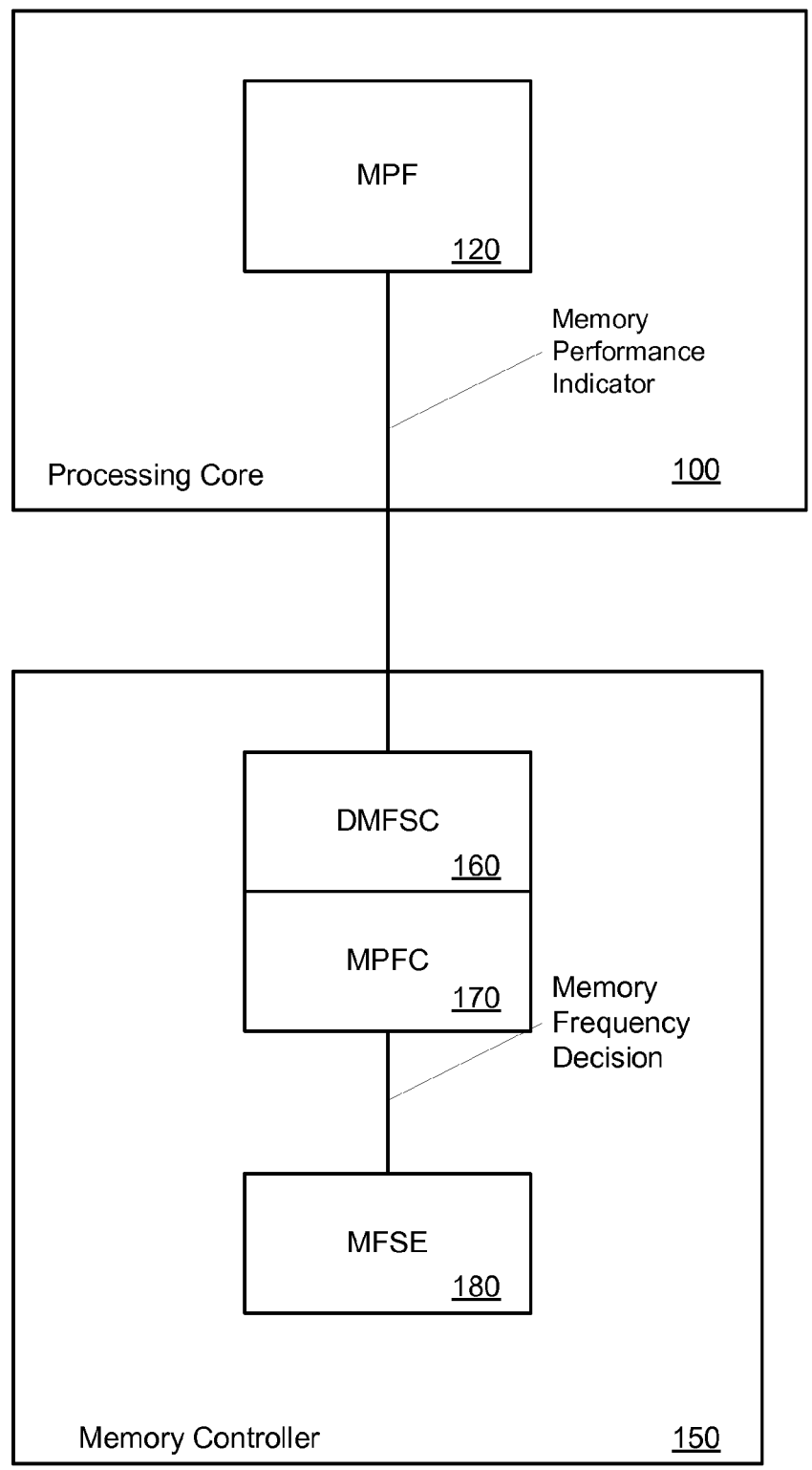
FIG. 1 is a block diagram of one embodiment of a system providing adaptive memory frequency scaling mechanisms.

In one embodiment, adaptive memory frequency scaling mechanisms may consist of four components: Memory Performance Factor (MPF), Dynamic Memory Frequency Scaling Controller (DMFSC), Memory Performance Factor Counter (MPFC) and Memory Frequency Scaling Engine (MFSE). FIG. 1 is a block diagram of one embodiment of a system providing adaptive memory frequency scaling mechanisms.

The example embodiment of FIG. 1 illustrates processing core 100 and memory controller 150 providing the components of the adaptive memory frequency scaling mechanisms. In alternate embodiments, the components may be provided by other system entities and/or may be distributed in a different manner.

In one embodiment, Memory Performance Factor (MPF) 120 is a hardware indictor of an application's memory performance on the side of processing core 100, which includes the information including, for example, memory bandwidth utilization, degree of overlap on memory accesses and degree of speculative memory accesses. Dynamic Memory Frequency Scaling Controller (DMFSC) 160 is a policy engine that determines the memory running frequency according to Memory Performance Factor (MPF) and triggers Memory Frequency Scaling Engine (MFSE) 180 to apply the decision.

In one embodiment, Memory Performance Factor Counter (MPFC) 170 is a hardware saturation counter for the history information of Memory Performance Factor. Memory Frequency Scaling Engine (MFSE) 180 is the passive action component. After receiving a trigger from DMFSC 160, MFSE 180 may the freeze system and reprogram the memory interface, changing the memory frequency and relocks phase locked loops (PLLs).

In one embodiment, Memory Performance Factor is monitored using a hardware counter. In one embodiment, cycles per instruction (CPI) is a component the MPF calculation and is determined as follows.

$$CPI = CPI\_core + MPI * BF * LAT \qquad \text{Equation (1)}$$

CPI_core: CPI with no memory latency
LAT: memory access latency
MPI: Last level cache misses per instruction
BF: Blocking factor shows performance sensitivity on memory access latency.

In one embodiment, MPF may be defined as:

$$MPF = MPI * BF \quad \text{Equation (2)}$$

Memory Performance Factor (MPF) can be converted to a combination of hardware performance counters.

$$MPF = (XQ\_EMPTY/Total\ Cycles) * (Load\_retired/Load\_dispatch) \quad \text{Equation (3)}$$

MPF=mem_stall % * mem_specu_factor

XQ_EMPTY: counting the stall cycles of processor by memory accesses (Load_retired/Load_dispatch): memory speculation factor.

When the memory stall percentage is not available, alternate computations may be utilized, for example, the product of memory bandwidth utilization and the memory speculation factor.

Figure 2:
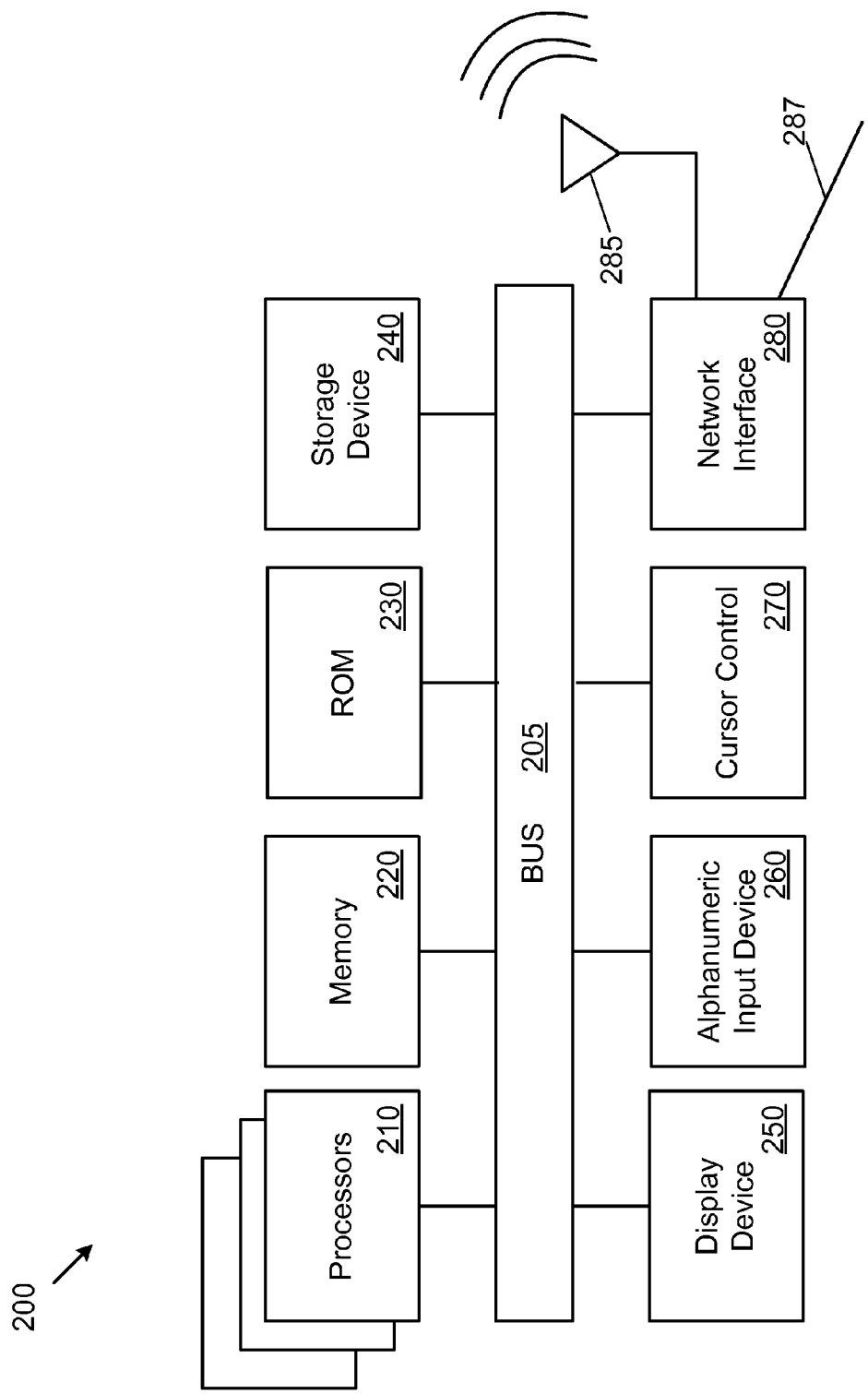
FIG. 2 is a block diagram of one embodiment of an electronic system.

FIG. 2 is a block diagram of one embodiment of an electronic system. The electronic system illustrated in FIG. 2 is intended to represent a range of electronic systems (either wired or wireless) including, for example, desktop computer systems, laptop computer systems, cellular telephones, personal digital assistants (PDAs) including cellular-enabled PDAs, set top boxes. Alternative electronic systems may include more, fewer and/or different components.

Electronic system 200 includes bus 205 or other communication device to communicate information, and processor 210 coupled to bus 205 that may process information. While electronic system 200 is illustrated with a single processor, electronic system 200 may include multiple processors and/or co-processors and/or multiple processing cores. Electronic system 200 further may include random access memory (RAM) or other dynamic storage device 220 (referred to as main memory), coupled to bus 205 and may store information and instructions that may be executed by processor 210. Main memory 220 may also be used to store temporary variables or other intermediate information during execution of instructions by processor 210.

In one embodiment, processor(s) 210 may include both the processor core and the memory controller illustrated in FIG. 1. In alternate embodiments, the processor core(s) and memory controller may be part of different components illustrated in FIG. 2.

Electronic system 200 may also include read only memory (ROM) and/or other static storage device 230 coupled to bus 205 that may store static information and instructions for processor 210. Data storage device 240 may be coupled to bus 205 to store information and instructions. Data storage device 240 such as a magnetic disk or optical disc and corresponding drive may be coupled to electronic system 200.

Electronic system 200 may also be coupled via bus 205 to display device 250, such as a cathode ray tube (CRT) or liquid crystal display (LCD), to display information to a user. Alphanumeric input device 260, including alphanumeric and other keys, may be coupled to bus 205 to communicate information and command selections to processor 210. Another type of user input device is cursor control 270, such as a mouse, a trackball, or cursor direction keys to communicate direction information and command selections to processor 210 and to control cursor movement on display 250.

Electronic system 200 further may include network interface(s) 280 to provide access to a network, such as a local area network. Network interface(s) 280 may include, for example, a wireless network interface having antenna 285, which may represent one or more antenna(e). Network interface(s) 280 may also include, for example, a wired network interface to communicate with remote devices via network cable 287, which may be, for example, an Ethernet cable, a coaxial cable, a fiber optic cable, a serial cable, or a parallel cable.

In one embodiment, network interface(s) 280 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Associated as well as previous or subsequent versions of the Bluetooth standard may also be supported.

In addition to, or instead of, communication via wireless LAN standards, network interface(s) 280 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Figure 3:
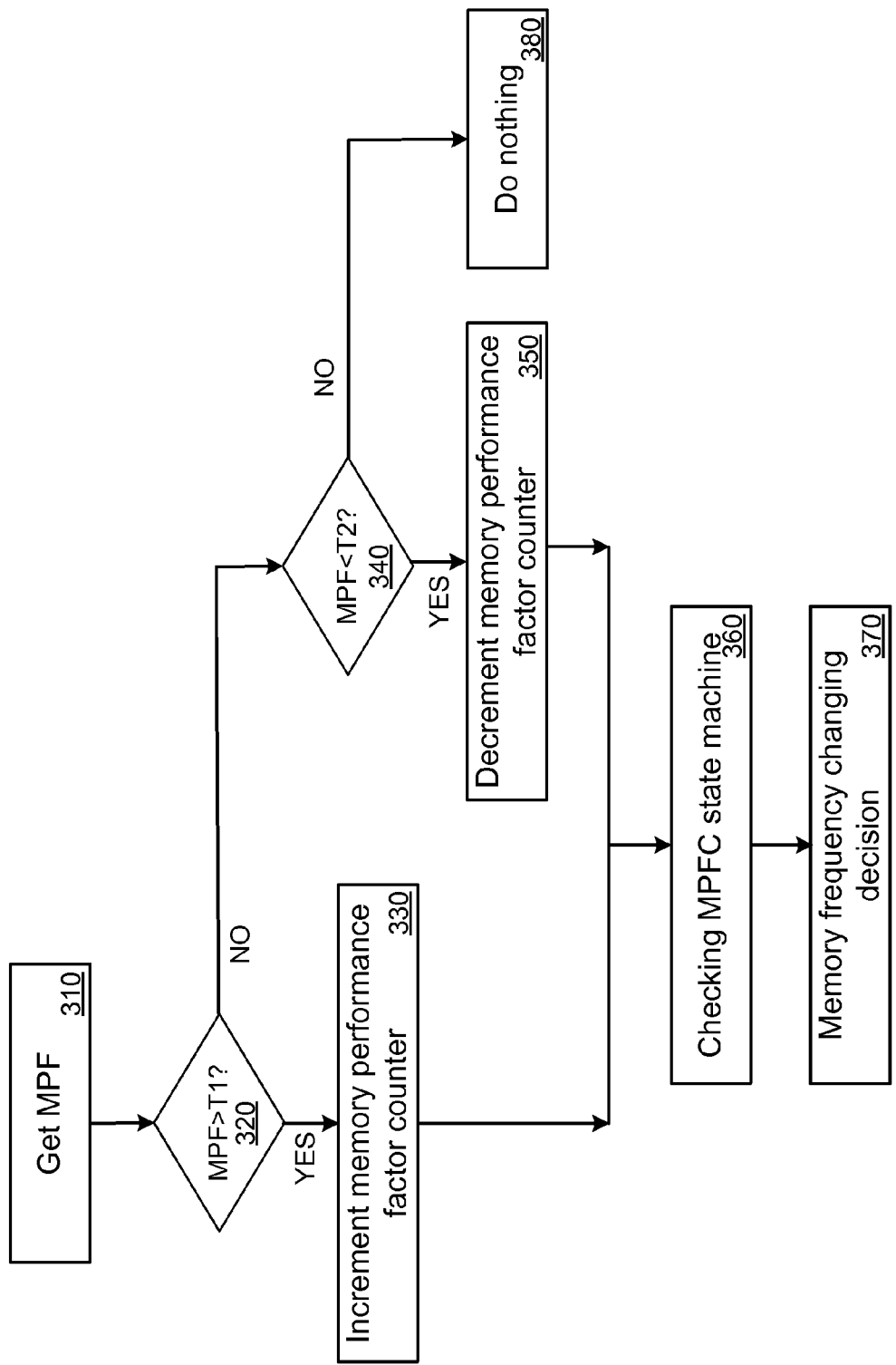
FIG. 3 is a flow diagram of one embodiment of a technique for providing adaptive memory frequency scaling.

FIG. 3 is a flow diagram of one embodiment of a technique for providing adaptive memory frequency scaling. In one embodiment, the technique of FIG. 3 is performed by the dynamic memory frequency scaling controller (DMFSC) discussed above. In alternate embodiments, other system components may provide this functionality.

The example of FIG. 3 utilizes two threshold values for scaling the memory frequency. In alternate embodiments, more than two threshold values may be used to support, for example, finer frequency adjustment granularity.

The MPF is determine, 310. The MPF can be determined as described above. The MPF is compared to a first threshold value (T1), 320. T1 represents an MPF value above which the operating frequency of the memory should be modified. If MPF is greater than T1, 320, the memory performance factor counter is incremented, 330.

If MPF is less than T1, 320, the MPF is compared to a second threshold value (T2), 340. T2 represents an MPF value below which the operating frequency of the memory should be modified. If MPF is less than T2, 340, the memory performance factor counter is decremented, 350. If the MPF is less than T1, 320, and greater than T2, 340, then the current memory operating frequency is maintained, 380.

The value of the memory performance factor counter is utilized to check and possibly transition between states of a state machine that is utilized to manage memory operating frequency. A state diagram for one embodiment of a state machine that may be used as described in FIG. 3 is described in greater detail below with respect to FIG. 4.

In one embodiment, the state of the MPFC state machine is checked and compared to the memory performance factor counter value, 360. A memory frequency change decision is made, 370, based at least on the comparison, 360. The result of the decision may cause the operating frequency of the memory to increase, decrease or stay the same depending on current operating parameters of the memory (e.g., operating frequency) as well as the monitored conditions as described above.

Thus, the operating frequency of the memory many be dynamically adapted as system conditions change. The techniques described herein may provide both power savings and performance improvements.

Figure 4:
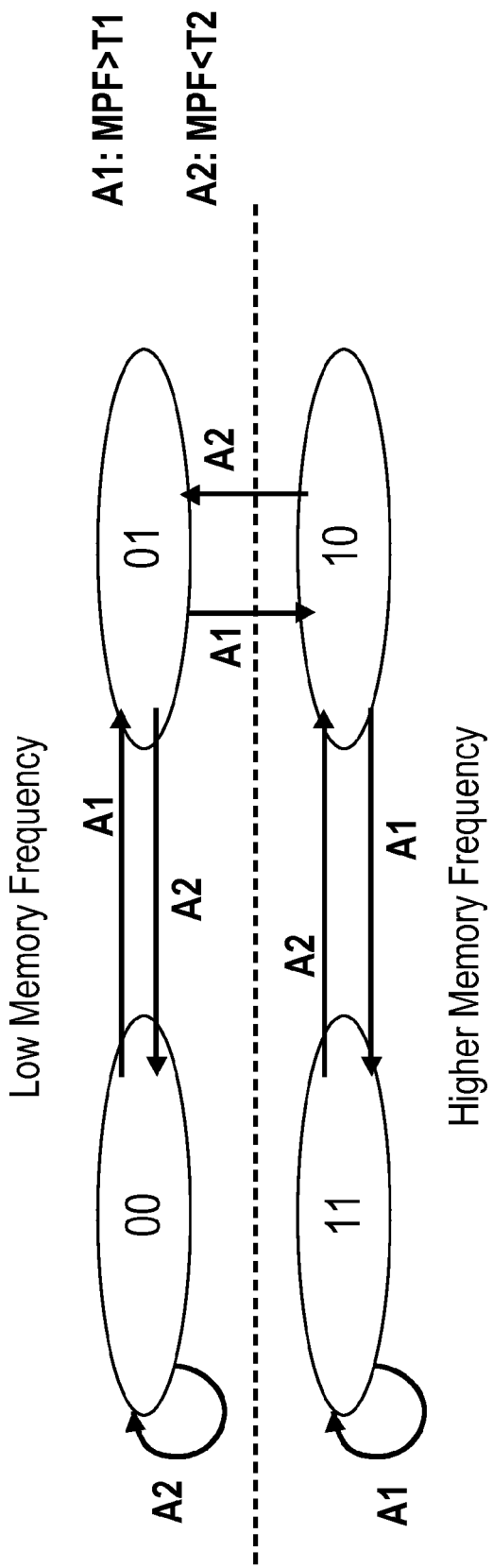
FIG. 4 is a state diagram for one embodiment of a technique for providing adaptive memory frequency scaling.

FIG. 4 is a state diagram for one embodiment of a technique for providing adaptive memory frequency scaling. The state machine of FIG. 4 may be used, for example, according to the operation described with respect to FIG. 3. In alternate embodiments, more states may be used to support, for example, finer frequency adjustment granularity.

In one embodiment, the state machine functionality is provided by the dynamic memory frequency scaling controller (DMFSC) described above. In alternate embodiments, the state machine may be provided by a different system component. In the state diagram of FIG. 4, state transitions labeled A1 result from the condition MPF>T1 as described above. Similarly, state transitions labeled A2 result form the condition MPF<T2 as described above.

The state machine corresponding to the states of FIG. 4 provides some hysteresis with respect to increasing and decreasing the operational frequency of the memory. In alternate embodiments, this hysteresis may be increased or eliminated.

In state 00, the memory is operating at a lower of two clock frequencies. Under the A2 condition, the state machine remains in state 00. In response to a A1 condition, the state machine transitions to state 01.

In state 01, the memory is operating at a lower of two clock frequencies. Under the A2 condition, the state machine transitions to state 00. In response to a A1 condition, the state machine transitions to state 10. In response to the transition from state 01 to state 10, the operating frequency of the memory is increased.

In state 10, the memory is operating at a higher of two clock frequencies. Under the A2 condition, the state machine transitions to state 01. In response to the transition from state 10 to state 01, the operating frequency of the memory is decreased. In response to a A1 condition, the state machine transitions to state 11 and remains at the higher operating frequency.

In state 11, the memory is operating at a higher of two clock frequencies. Under the A2 condition, the state machine transitions to state 10 and remains at the higher operating frequency. In response to a A1 condition, the state machine remains in state 11 and remains at the higher operating frequency.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
    determining a memory performance parameter for at least a portion of a memory system in an electronic system;
    comparing the memory performance parameter to one or more threshold values; and
    adjusting an operating frequency of the memory system based on results of the comparison of the memory performance parameter and the one or more threshold values by changing a memory frequency.

2. The method of claim 1 wherein the memory performance parameter comprises memory stall percentage.

3. The method of claim 1 wherein the memory performance parameter comprises a product of memory bandwidth utilization and memory speculation factor.

4. The method of claim 1 wherein the memory performance parameter comprises memory power consumption.

5. The method of claim 1 wherein adjusting an operating frequency of the memory system based on results of the comparison of the memory performance parameter and the one or more threshold values is performed during operation of a host processing core.

6. A system comprising:
    a processing core having a Memory Performance Factor (MPF) agent with an indictor of an application's memory performance, the MPF agent to generate a memory performance measure based on the memory performance;
    a memory controller coupled with the processing core, the memory controller having a Dynamic Memory Frequency Scaling Controller (DMFSC) and a Memory Frequency Scaling Engine (MFSE), the DMFSC to determine a memory operating frequency according to the memory performance measure and to trigger the MFSE to apply the MPF to cause one or more memory devices to change a memory frequency operate according to the determined operating frequency.

7. The system of claim 6 wherein the memory performance is determined based on one or more memory performance parameters.

8. The system of claim 7 wherein the one or more memory performance parameters comprise at least a memory stall percentage.

9. The system of claim 7 wherein the one or more memory performance parameters comprise at least a product of memory bandwidth utilization and memory speculation factor.

10. The system of claim 7 wherein the one or more memory performance parameters comprise at least a memory power consumption.

11. A system comprising:
    a processing core having a Memory Performance Factor (MPF) agent with an indictor of an application's memory performance, the MPF agent to generate a memory performance measure based on the memory performance;
    a memory controller coupled with the processing core, the memory controller having a Dynamic Memory Frequency Scaling Controller (DMFSC) and a Memory Frequency Scaling Engine (MFSE), the DMFSC to determine a memory operating frequency according to the memory performance measure and to trigger the MFSE to apply the MPF to cause one or more memory devices to change a memory frequency operate according to the determined operating frequency; and
    a dynamic random access memory coupled to the memory controller to operate at the determined operating frequency.

12. The system of claim 11 wherein the memory performance is determined based on one or more memory performance parameters.

13. The system of claim 11 wherein the one or more memory performance parameters comprise at least a memory stall percentage.

14. The system of claim 11 wherein the one or more memory performance parameters comprise at least a product of memory bandwidth utilization and memory speculation factor.

15. The system of claim 11 wherein the one or more memory performance parameters comprise at least a memory power consumption.

* * * * *